United States Patent
Do (12)

(10) Patent No.: US 6,321,087 B1
(45) Date of Patent: Nov. 20, 2001

(54) MONITORING DATA OF A SELECTED CALL IN A WIRELESS TELECOMMUNICATION SYSTEM

(75) Inventor: Tuan Anh Do, Naperville, IL (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/227,385

(22) Filed: Jan. 8, 1999

(51) Int. Cl.$^7$ ................................................. H04Q 7/20
(52) U.S. Cl. .................. 455/436; 455/67.1; 455/560; 455/423
(58) Field of Search .................... 455/436, 422, 455/524, 525, 439, 442, 502, 67.1, 560, 561, 423, 424

(56) References Cited

U.S. PATENT DOCUMENTS

| | | | |
|---|---|---|---|
| 5,659,604 | 8/1997 | Beckman | 379/220 |
| 5,854,981 | * 12/1998 | Wallstedt | 455/439 |
| 5,987,099 | * 11/1999 | O'Neill | 379/60 |
| 6,119,005 | * 9/2000 | Smolik | 455/436 |
| 6,119,011 | * 9/2000 | Borst | 455/452 |
| 6,128,287 | * 10/2000 | Freeburg | 370/331 |

FOREIGN PATENT DOCUMENTS 9401977   1/1994   (WO) ............................... H04Q/7/04

\* cited by examiner

*Primary Examiner*—Nguyen T. Vo
*Assistant Examiner*—John J. Lee
(74) *Attorney, Agent, or Firm*—Werner Ulrich

(57) ABSTRACT

A method and apparatus for obtaining call record information in a mobile telecommunication switching system. The information is obtained, not only from the base station serving a call at the time that of the call record information is requested, but also for obtaining such information from prior base stations serving the call and subsequent base stations serving the call. Whenever a call is handed off, the identity of the call record and the handing-off base station, as well as the identity of the handing-off base station and the mobile switching center, (MSC), serving the call in the previous base station are recorded in the handed to base station. When a request for call record information is received, the base station serving the call transmits such call record information, and also transmits a request to the immediately prior base station to transmit its call record information from the identified call record. The predecessor then requests a similar action from its predecessor, if any. The initial base station for serving the call is initialized to record that it has no predecessors. Advantageously, this arrangement allows call record information from all predecessor base stations to be obtained, and transmitted an MSC for subsequent processing in an operation support system.

20 Claims, 3 Drawing Sheets

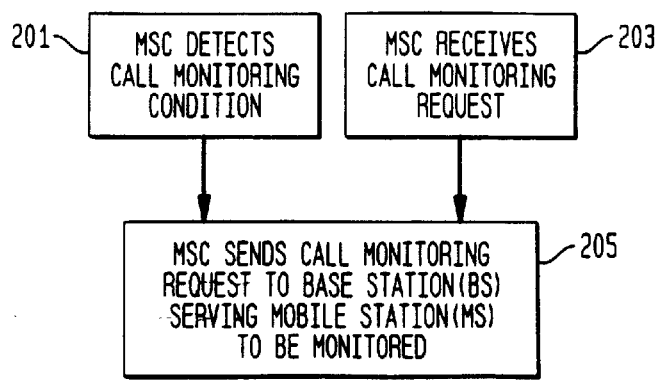
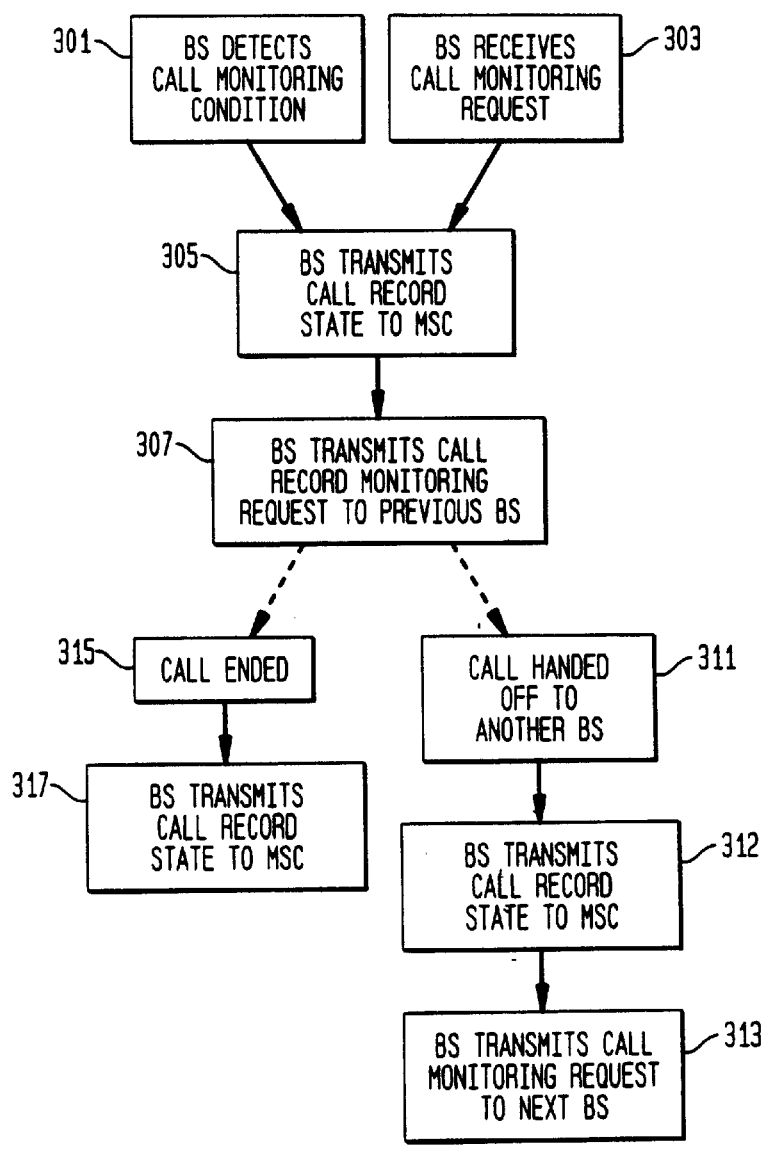

MONITORING DATA OF A SELECTED CALL IN A WIRELESS TELECOMMUNICATION SYSTEM

TECHNICAL FIELD

This invention relates to arrangements for obtaining data for calls made by a selected mobile station.

PROBLEM

Base stations and mobile switching centers of a wireless telecommunication system are arranged to detect many kinds of errors. Sometimes, these errors are detected in the middle of a call, possibly after a mobile station has been handed off one or more times from earlier base stations. Under these circumstances, there is no good way in the prior art of capturing data for earlier stages of the call from earlier base stations.

SOLUTION

Applicant has solved the above problem, and made a contribution over the prior art in accordance with this invention, wherein a call record of a call, as maintained in a base station, includes an identity of the base station which passed the call, the call record identification for that call in that base station, and optionally, the identity of the mobile switching center that controls that base station; when an error condition is discovered, the base station that controls the call at the time of the discovery thereby has a link to its predecessor base station and call record, and that base station has a similar link to its predecessor; the original base station, of course, has no indication of a predecessor; data from the predecessor call records can then be transmitted to the mobile switching center as long as the call record, which, for any predecessor station could be inactive, if the mobile has been transferred to another base station, or active, if the station still serves the mobile in a soft hand-off situation, has not yet been cleared. Advantageously, this arrangement will, under normal circumstances, (i.e., sufficient memory space for retaining call records for most of the duration of a call), allow all call record data for a call being monitored to be retrieved, even if there was no indication at the time that a base station handed off a call, that the call was going to be monitored.

BRIEF DESCRIPTION OF THE DRAWING(S)

FIG. 2 is a flow diagram illustrating the process of detecting a request for data about a call;

FIG. 3 is a flow diagram illustrating actions performed in the base station currently serving the mobile station whose call is being monitored;

DETAILED DESCRIPTION

Figure 1:
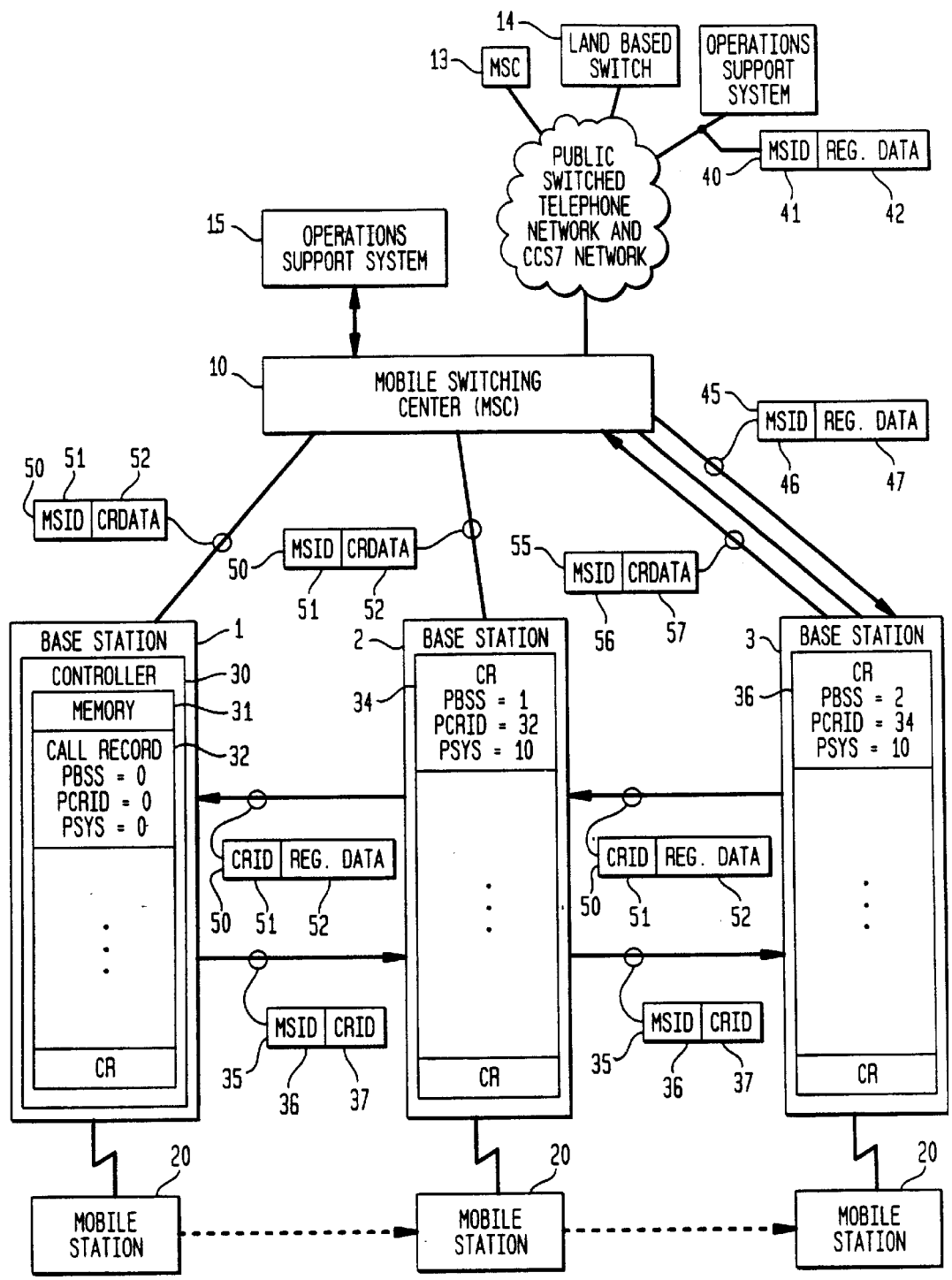
FIG. 1 is a block diagram illustrating the operation of Applicant's invention.

FIG. 1 is a block diagram illustrating the operation of Applicant's invention. The diagram illustrates a mobile telecommunication system in which three different base stations, BS1, BS2, and BS3, have served, or are serving a call. The call, when originally established, had mobile station 20, served by base station 1; subsequently, mobile station 20 went into an area served by base station 2, and thereafter, mobile station 20 went into a cellular area served by base station 3. The three base stations are in turn, controlled by, and have switching performed for them, by mobile switching center (MSC) 10. Mobile switching center 10 is connected by a network 11, comprising a common channel signaling network, (CCS 7), and a public switched telephone network, (PSTN), for interconnecting the MSC with another MSC 13, for handling calls when a mobile strays outside the area served by MSC 10, a land based switch 14, for completing or originating calls, one of whose parties is land-based, and an operations support system, (OSS), 12 for providing operations, administration, and maintenance support to MSC 10. Alternatively, an OSS 15 can be directly connected to MSC 10. Base station 1 comprises control 30, which includes a memory 31, which in turn, includes a plurality of call records such as call record 32, from when the call was originally established. The call record, in accordance with the principles of Applicant's invention, was initialized with the identity of a previous base station, a previous call record identification, and the identification of a previous system, (such as a system controlled by MSC 13). In this case, since the call was originally established in base station 1, the call record contains a blank for all three of these previous indicators. Knowing when the mobile station moved to an area served by base station 2, base station 1 sent a message, such as message 35, identifying the call record, (37), within base station 1, and the identity of the corresponding mobile station, (36). Accordingly, call record for this call in base station 2, which in this example is call record 34, is initialized with the identity of the previous base station (1), the identity of the previous call record (32), and the identity of the previous system, which in this case is 10, since the call was served by MSC 10 while it was being served from base station 1. (In this example, of course, the call continues to be served from MSC 10). The identity of the previous base station and previous system are supplied inherently as part of the hand-off process, and are used to initialize the call record appropriately in accordance with Applicant's invention.

When the mobile station 20 moves to the area served by base station 3, and is handed off to base station 3, the call record 36 in base station 3, is initialized with the previous base station (2), the previous call record identifier (34), and the previous system (10), through another use of message type 35, as well as the other hand-off messages. Recording the previous system makes it possible to obtain call record data from another MSC, if the mobile station was handed-off across MSC boundaries.

Suppose that at some point, such as during the time when the call is being served by base station 3, a request is made to get data for the call, or an abnormal condition is detected in MSC 10, or a serving base station. If the request is made from an operation support system such as OSS 12, either automatically or through a request from the craft attending OSS 12, a message 40 containing the mobile station identifier 41, and an indication that this is a data request 42, is sent over the CCS 7 network 11, to MSC 10. MSC 10 would then forward a message 45, to base station 3. Message 45 would include an identifier of the mobile station 46, and an indication that this is a request for data about the call 47.

In response to receipt of this data, base station 3 transmits the call record data for the call involving the identified mobile station 20. The message, type 55, contains the mobile station identification 56, and the call record data 57.

In addition, base station 3 transmits a message 50 to base station 2. The message 50 contains the call record identifier 51, (in this case, 34), and a request that data about the call be sent to the MSC, (52). In response to receipt of message 50, base station 2 transmits a message 55, containing the identity of the mobile station 56, and the call record data for the call 57, as it existed in base station 2. In addition, base station 2 transmits a message 50, containing the call record identifier 51, (in this case 32), and a request that data be transmitted to the MSC, (52) to the previous base station, base station 1. In response to receipt of this message 50, base station 1 transmits the contents of its call record for that call, i.e., the contents of call record 32 in another message 55, including the identifier of the mobile station 56. Base station 1 does not transmit a message 50 to a previous base station, because it recognizes that there is no previous base station, since the record in its call record of previous base station, previous call record, and previous system are all zero, or blank.

Using this arrangement, the three base stations transmit to the MSC the data in their call records for the call that is presently being made from, or to, mobile station 20.

Additionally, if the mobile station moves from base station 3 to another base station, (including one of base stations 1 and 2), base station 3 sends a message 50 to the handed off base station to continue the link. At the time of the hand-off, base station 3 also transmits another call record data message 55, to MSC 10.

When the call disconnects, the base station serving the call at the time of the disconnect, sends a message 55 to MSC 10 to complete the record for the call.

FIGS. 2–6 are flow charts illustrating the method of Applicant's invention. The flow charts are implemented using control processors under program control in the MSC 10, and the base stations 1, 2, or 3.

FIG. 2 is a flow diagram illustrating the operation of the process of detecting a request for data about a call. Action Box 201 shows that the MSC, itself, detects a call condition that requires the call to be monitored. For example, an MSC may receive a message containing an invalid base station number. Action Block 203, the MSC receives a request for monitoring the call. The request is likely to come from an operation support system, which may automatically detect the condition requiring call monitoring, or which may transmit the request on the basis of a request initiated by the craft at the operation support system. In either case, the MSC sends a call monitoring request to the base station serving the mobile station to be monitored, (Action Block 205).

FIG. 3 illustrates actions performed in the base station currently serving the mobile station whose call is being monitored. Action Block 301 indicates a situation programmed into the base station, wherein the base station detects a condition that requires the call to be monitored. Action Block 303 indicates that a message sent in Action Block 305, (FIG. 2), from the serving MSC requires that a call be monitored. In either case, transmits the state of the call record for the mobile station being monitored to the MSC, (Action Block 305). In addition, the base station currently serving the call, transmits a call record monitoring request to the previous base station, (Action Block 307). This request, sent in a message type 50, includes the identity of the call record in the previous base station. Subsequently, the call may be handed-off to another base station, (Action Block 311). The base station transmits its call record state to the MSC, (Action Block 312). Then, in accordance with one feature of this invention, the call monitoring request is transmitted to that next base station, (Action Block 313); the call monitoring request if a message type 50, and includes the call record identifier of the base station sending the request. While the primary purpose of this invention is to track sources of errors by examining the previous records, for some cases, the subsequent call messages may also contain useful information. Further, the identity, (including the identity of the serving MSC), is transported in the hand-off messages so that the call record can be initialized with the identity of the handing-off base station and MSC, as well as the identity of the call record in that base station.

If the call is not handed off to another base station, then when the call is terminated, (Action Block 315), the base station transmits its call record state at the time of termination to the MSC, (Action Block 317).

Figure 4:
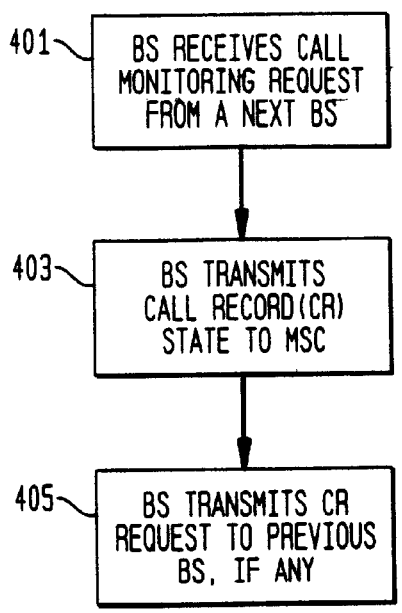
FIG. 4 is a flow diagram illustrating actions performed in previous base stations.

FIG. 4 illustrates actions performed in previous base stations. A previous base station receives a call monitor request from its next base station, (Action Block 401). This call monitor request includes this request in a message type 50, which includes the identification of the call record in the receiving base station. The base station transmits the call record state of the identified call record to the MSC, (Action Block 403), and it transmits a call record request (of message type 50), to its previous base station, if any, (Action Block 405). The "if any" situation is identified by the absence of a previous call record identifier, previous base station, and previous system in the call record for the call.

Figure 5:
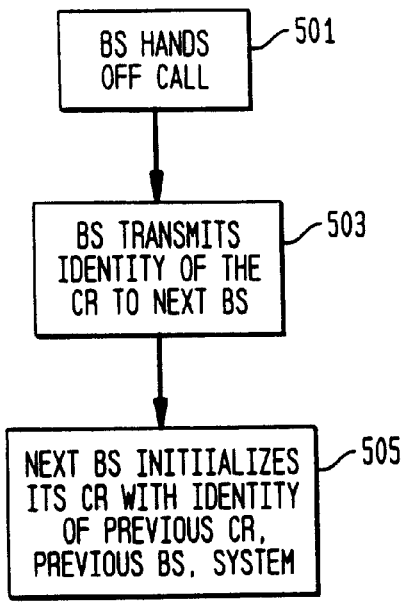
FIG. 5 is a flow diagram illustrating actions performed when a base station hands off the call.

FIG. 5 illustrates actions performed when a base station hands off a call. The base station hands off the call, (Action Block 501), and transmits the identity of the call record for this call in the transmitting base station to the next base station, (Action Block 503). The message of Action Block 503 is a type 50 message. The next base station then initializes its call record for the call with the identity of the previous call record, (received in message 50), and the identity of the previous base station and previous system received in other hand-off control messages, (not shown).

Figure 6:
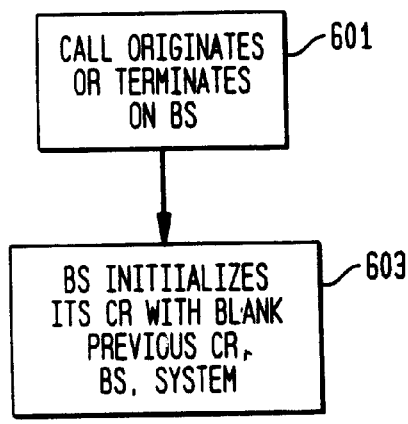
FIG. 6 is a flow diagram illustrating actions required in a base station at the time the call originates or terminates over a base station.

FIG. 6 illustrates actions required in a base station at the time of origination, or at the time the call originates or terminates on a base station, in order to implement Applicant's invention. The call originates or terminates on a base station, (Action Block 601). The base station then initializes its call record with a blank previous call record, blank previous base station, and blank previous system, (Action Block 603). This is to prepare for Action Block 405, (FIG. 4), to allow a base station to avoid transmitting a call record request to a previous base station if there is no such previous base station.

In this embodiment, an inter-system call hand-off is assumed to be possible. This is the reason for having and maintaining a previous system segment in the call record. For cases in which inter-system call hand-offs are not allowed, it is not necessary to maintain this segment.

The call record is further enhanced to include the identity of the predecessor base station, the identity of the call record for that call in that predecessor base station, and the identity of a predecessor mobile switching center. If base station 2 discovers that there is an error condition in a particular call, and that data for that call should be reported to the mobile switching center, it sends a message 50, to the predecessor base station 1, including the call record identifier 51, and an indication that monitoring data has been requested for dependent indication station 52, that monitoring data has been requested for that call. Base station 1 will then transmit a message 55, including the identity of the mobile station of that call 56, and the call record data for that call 57. If base station 1 had a predecessor base station, it would make a similar request of that predecessor base station as base station 2, made of base station 1. If base station 1 has no predecessor, then the predecessor base station identity and a predecessor call record identity would be blank.

The above is a description of one preferred embodiment of Applicant's invention. Many other arrangement will be apparent to those of ordinary skill in the art, without departing from the scope of Applicant's invention. Applicant's invention is, therefore, only limited by the attached Claims.

What is claimed is:

1. In a wireless cellular telecommunications system, comprising a mobile switching center (MSC), and a plurality of base stations, a method of retrieving call processing data for a selected call comprising the steps of:

on handoff, transmitting an identity of a call record, comprising call processing data for a call, and of a handing off base station from said handing off base station to a handed off base station;

storing said identities of the handing off base station and the call record in said handing off base station in a call record for said call in said handed off base station;

retaining a call record for said call in said handing off base station;

selecting a particular call to be monitored;

responsive to said selecting, transmitting a request message comprising the stored call record identity to a predecessor (handing off) base station of said base station serving said particular call; and transmitting data from said predecessor call record to said MSC.

2. The method of claim 1, wherein the selecting step comprises the step of detecting an abnormal condition, requiring the retrieval of data for a call, in the base station serving said call.

3. The method of claim 1, wherein the selecting step comprises the step of detecting an abnormal condition, requiring the retrieval of data for a call, in a mobile switching center serving said call.

4. The method of claim 1, wherein the selecting step comprises the step of detecting an abnormal condition, requiring the retrieval of data for a call, in an operations support system serving said MSC for said call.

5. The method of claim 1, wherein the selecting step comprises the step of selecting in response to a request from a craft attending said call.

6. The method of claim 1, wherein the step of storing said identities further comprises the step of storing an identity of a handing-off mobile switching center;

wherein data from said predecessor call record of a base station served by a different MSC can be identified and obtained.

7. The method of claim 1, further comprising the step of initializing an initial base station for serving the call, with information identifiable as representing that no predecessor call records exist for said call.

8. The method of claim 1, further comprising the step of transmitting a request message comprising another stored call record identity from said predecessor base station, and transmitting data from the predecessor call record to said MSC, provided such a predecessor base station call record exists.

9. The method of claim 1, further comprising the step of following reception of a selecting command processor, transmitting a request on subsequent hand-off operations to transmit call record information from subsequent base stations to said MSC.

10. The method of claim 1, further comprising the step of responsive to a disconnect of said call, transmitting a call record message from the base station serving said call at the time of said disconnect.

11. In a wireless cellular telecommunications system, comprising a mobile switching center (MSC), and a plurality of base stations, apparatus for retrieving call processing data for a selected call comprising:

in base stations of said network, processor means comprising memory and control means, for controlling the following operations:

on hand-off, transmitting an identity of a call record, comprising call processing data for a call, and of a handing off base station from said handing off base station to a handed off base station;

storing said identities of the handing off base station and the call record in said handing off base station in a call record for said call in said handed off base station;

retaining a call record for said call in said handing off base station;

selecting a particular call to be monitored;

responsive to said selecting, transmitting a request message comprising tile stored call record identity to a predecessor (handing off) base station of said base station serving said particular call; and transmitting data from said predecessor call record to said MSC.

12. The apparatus of claim 11, wherein the selecting comprises selecting in response to detecting an abnormal condition, requiring the retrieval of data for a call, in the base station serving said call.

13. The apparatus of claim 11, wherein the selecting comprises selecting in response to detecting an abnormal condition, requiring the retrieval of data for a call, in a mobile switching center serving said call.

14. The apparatus of claim 11, wherein the selecting comprises selecting in response to detecting an abnormal condition, requiring the retrieval of data for a call, in an operations support system serving said MSC for said call.

15. The apparatus of claim 11, wherein the selecting comprises selecting in response to a request from a craft attending said call.

16. The apparatus of claim 1, wherein the storing said identities further storing an identity of a handing-off mobile switching center;

wherein data from said predecessor call record of a base station served by a different MSC can be identified and obtained.

17. The apparatus of claim 11, the operations further comprising:

initializing an initial base station for serving the call, with information identifiable as representing that no predecessor call records exist for said call.

18. The apparatus of claim 11, the operations further comprising:

transmitting a request message comprising another stored call record identity from said predecessor base station, and transmitting data from the predecessor call record to said MSC, provided such a predecessor base station call record exists.

19. The apparatus of claim 11, the operations further comprising:

following reception of a selecting command processor, transmitting a request on subsequent hand-off operations to transmit call record information from subsequent base stations to said MSC.

20. The apparatus of claim 11, the operations further comprising:

responsive to a disconnect of said call, transmitting a call record message from the base station serving said call at the time of said disconnect.

* * * * *